E. MAUVILLIN AND V. GUILLET.
METHOD FOR PRODUCING IMITATION OF MOTHER-OF-PEARL.
APPLICATION FILED MAY 11, 1914.
1,351,529. Patented Aug. 31, 1920.
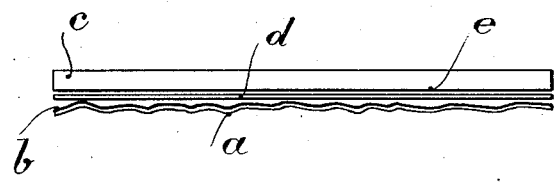

UNITED STATES PATENT OFFICE.

EMILE MAUVILLIN AND VICTOR GUILLET, OF COURBEVOIE, FRANCE.

METHOD FOR PRODUCING IMITATION OF MOTHER-OF-PEARL.

1,351,529.   Specification of Letters Patent.   Patented Aug. 31, 1920.

Application filed May 11, 1914. Serial No. 837,876.

*To all whom it may concern:*

Be it known that we, EMILE MAUVILLIN and VICTOR GUILLET, both citizens of the French Republic, residing at Courbevoie, Republic of France, have invented certain new and useful Improvements in Methods for Producing Imitation of Mother-of-Pearl, of which the following is a specification.

The present invention relates to a process for imparting a mother of pearl aspect to pictures or images placed under a plate of opaque glass.

It is old to reproduce the iridization of soap bubbles by spreading thin films, residues of volatile liquids or of chemical reactions, on polished surfaces, but these processes in no way yield the effects produced by the reflection of light on mother of pearl.

In accordance with the present invention this result is obtained by giving to the polished plates any type of undulation; these undulated surfaces are then iridized by means of a light coating of a highly volatile solution. The interference colors then appear very irregularly distributed by reason of the difference of level caused by the undulation. These interference colors manifest themselves better in proportion as the liquid used as an iridization agent is capable of leaving a thinner residue. Light contrasts are thus obtained which cause a mixing or mingling of all the colors of the spectrum, but these effects do not become actually visible unless there is placed above the iridized plate a diffusing, opalescent or, preferably, finely ground screen, through which the colored radiations pass.

In order to utilize these luminous effects there is produced on glass letters or designs an alternate and opaque bottom, and the plate of glass thus prepared is placed on the diffuser screen above mentioned; the letters or designs then appear as if of mother of pearl detached from the opaque bottom.

Such color or colors may be caused to predominate in the designs as desired by incorporating the suitable soluble color with the iridizing solutions.

An embodiment is represented by way of example on the accompanying drawing, which is a section on enlarged scale of an article to which the improved process for the production of artificial mother of pearl has been applied.

A plate of nickel plated zinc $a$ is first undulated by pressing in a correspondingly engraved matrix and by means of a roller and by hammering various parts; the plate thus undulated is then cleansed and dipped in a solution of normal 1% gun cotton collodion. After rapid drying there remains on the plate a thin film $b$, the colors of which appear widely varied and greatly dispersed. Upon the plate $a$ there is placed a diffuser screen $d$ obtained in the following manner: On a very thin plate of glass there is poured a diffusing solution formed of:

| | | |
|---|---|---|
| Ether | 1000 | volumes |
| Benzin | 500 | " |
| Mastic | 60 | grams |
| Sandarac | 60 | " |

After drying, this solution leaves on the plate a granular coating which gives the appearance of very finely ground glass.

Finally, upon said diffuser screen $d$ there is placed a glass plate $c$ on the lower surface $e$ of which a positive image has been executed either by means of opaque varnish or by photography, so that the design will not show any half tone but only successions of interrupted opaque lines or opaque surfaces. The iridescent colorings of mother of pearl are shown through the transparent parts of the drawing or design. It is well understood that the details of operation may be widely varied without departing from the spirit of the invention.

Thus, the surface may be undulated before or after iridization; it may affect any geometrical form and have any depth, may be produced by pressure, hammering, etc., manually or mechanically. The iridization may be produced by any known process, but preferably by deposition of a volatile solution. The undulated and iridized surfaces may likewise be formed by cut or carved schemes, letters, etc., applied on a diffusing surface. The iridization may also be applied under surfaces of molded crystal (glass).

The diffuser screen $d$ may be obtained by deposition of resin or other colloids or by mechanical graining (stippling etc.), sand blast or the action of hydrofluoric acid, on glass, mica, etc. This diffuser screen may be either an independent film, as shown on the figure, or may form part of the surface of the design itself, in which case it is obtained by pouring the diffusing solution on the side $e$ of the plate $d$, after complete drying of the design or of the photograph on this surface. In all cases the diffusing screen must be interposed between the design and the undulated and iridized surface $a$.

The designs, letters or ornaments may be made by hand with any opaque products; they may be most simply obtained by making them directly on the dull side of a sheet of celluloid; they may likewise be made by printing with fatty printer ink, by powdering, transfer or photography. This process may be applied to signs, advertisements and to the decoration of walls or any kind of art objects.

Claims:

1. Article presenting the appearance of mother of pearl formed by: an iridized and irregularly undulated surface, a ground diffuser screen placed on said surface and a glass plate itself placed on said screen and provided on its lower surface with designs or letters having parts alternately opaque and transparent.

2. Article presenting the appearance of mother of pearl formed by: an irregularly, undulated surface rendered iridescent by means of a suitable iridizing solution and having a predominant coloring produced by the addition of a suitable soluble substance to the iridizing solution; a ground diffuser screen placed on said surface and a glass plate itself placed on said screen and provided on its lower surface with designs or letters presenting alternate opaque and transparent parts.

In witness whereof we have hereunto set our hands in the presence of two witnesses.

EMILE MAUVILLIN.
VICTOR GUILLET.

Witnesses:
ALBERT DE CARALADE,
PIERRE REGIMBEAU.